June 17, 1969

R. E. RICHARDSON 3,450,517

METHOD OF AND APPARATUS FOR PRESS BENDING VERTICALLY
SUSPENDED GLASS SHEETS

Filed Oct. 26, 1966

Inventor
Ronald E. Richardson
By Cushman, Darby Cushman
Attorneys

June 17, 1969            R. E. RICHARDSON           3,450,517
METHOD OF AND APPARATUS FOR PRESS BENDING VERTICALLY
SUSPENDED GLASS SHEETS
Filed Oct. 26, 1966
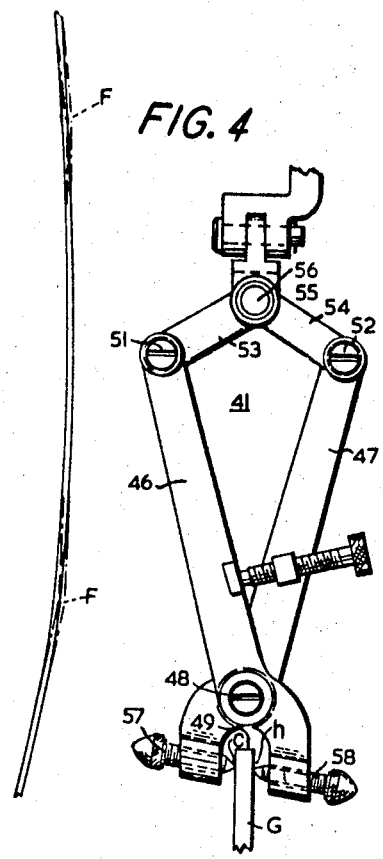
FIG. 4
FIG. 5
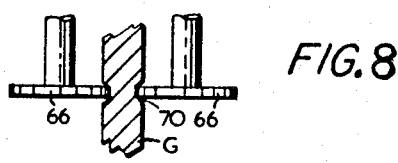
FIG. 8
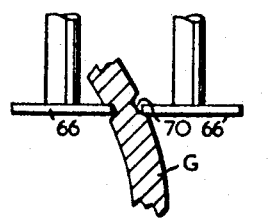
FIG. 9
Inventor
Ronald E. Richardson
By Cushman, Darby & Cushman
Attorneys

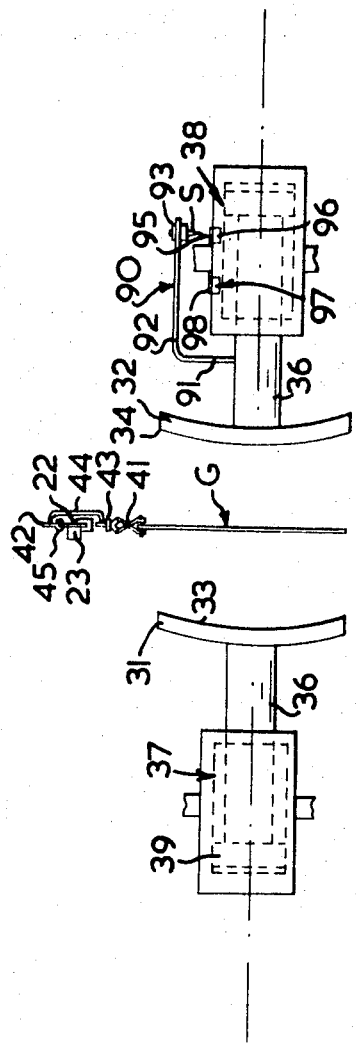
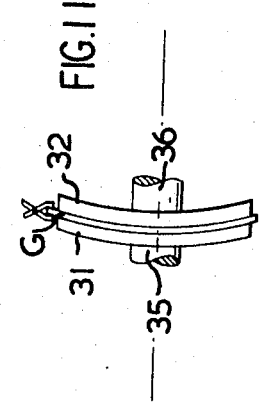

United States Patent Office 3,450,517
Patented June 17, 1969

3,450,517
METHOD OF AND APPARATUS FOR PRESS BENDING VERTICALLY SUSPENDED GLASS SHEETS
Ronald E. Richardson, Oshawa, Ontario, Canada, assignor to PPG Industries, Inc., a corporation of Pennsylvania
Continuation-in-part of application Ser. No. 507,772, Nov. 15, 1965. This application Oct. 26, 1966, Ser. No. 609,971
Claims priority, application Canada, Oct. 27, 1965, 943,875
Int. Cl. C03c 23/02; C03b 23/02
U.S. Cl. 65—106                        6 Claims

ABSTRACT OF THE DISCLOSURE

A press bending operation wherein a sheet of glass supported by scissor type self-closing tongs is brought between a pair of glass forming members movable towards and away from one another. The forming members are brought into frictional supporting engagement with the glass sheet, the tongs are then released suddenly from supporting engagement with the glass sheet and the glass is thereafter bent to the desired shape by means of the forming members.

---

This is a continuation-in-part of application Ser. No. 507,772 filed Nov. 15, 1965, now abandoned.

This invention relates to improvements in press bending glass sheets to shape the same wherein the glass sheet is suspended from an overhead rail and more particularly, to releasing the hangers from engagement thereof with the sheet during the shaping operation. Release of the tong from the sheet avoids distortion in the bent glass sheet which in the past has resulted from the tong applying a force during the sandwiching operation.

Flat glass sheets are shaped successively by heat softening and sandwiching the major surfaces thereof between a pair of glass forming members having complementary convex and concave shaping surfaces opposite one another. The glass sheets are conveyed along an overhead conveyor to the shaping members and are gripped adjacent their upper edges by tongs. Each glass sheet is suspended in a vertical plane by the tongs and normally more than one set of tongs is needed in which event they are disposed in horizontal spaced relationship along the upper edge of the suspended sheet.

To effect bending, a pair of forming members are moved inwardly to sandwich the sheet of glass therebetween while the latter is suspended from the overhead rail by the tongs. When shaping of the sheet consists of bending the same along a substantially horizontal axis, there results a vertical shortening of the glass sheet during bending. Since the glass is grasped by the tongs, the vertical shortening results in stretching the glass by the tongs since they are quite rigid and anchored by the conveyor. This stretching effect is further aggravated by contraction of the metal tongs heated to elevated temperatures in the heating lehr and then subjected to a substantially lower temperature at the bending station. A further deformation or defect in the glass is caused by the tongs being substantially vertical and tending to pull the glass into the tong receiving notches in the upper edges of moulds commonly used in such a bending operation. As a matter of convenience, the distortion in the glass caused by the tongs being in engagement therewith during bending may be referred to as tong effect.

It is an object of the present invention to minimize the amount of distortion caused by the tongs grasping the sheet during the bending operation.

In accordance with the present invention, distortion caused by the tong stretching or twisting the glass is eliminated by releasing the tongs from supporting engagement with the glass sheet during the bending operation. The invention is illustrated by way of example in the accompanying drawings wherein:

FIG. 4 is a top plan view of a bent sheet of glass illustrating in exaggerated scale deformation caused during bending by the tongs which grasp the sheet adjacent its upper edge;

FIG. 5 is a vertical partial elevational view of exaggerated size illustrating a pair of tongs for suspending a glass sheet;

FIGS. 8 and 9 are partial sectional vertical views illustrating tongs grasping respectively an unbent and a bent sheet of glass;

FIG. 10 is substantially identical to FIG. 2 but instead of the piston rods, to which the forming members are secured, being inclined they are horizontal; and FIG. 11 is the same as FIG. 3 but again illustrates, as in FIG. 10, the piston rods in a horizontal position.

Figure 1:
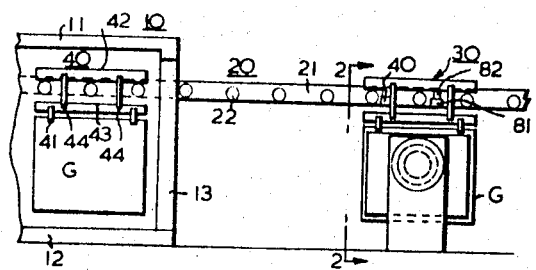
FIG. 1 is a vertical, elevational view of a portion of a glass heating lehr and horizontal conveyor in alignment with a press bending station.

Referring now in detail to the drawings, shown in FIG. 1 is the trailing end of a heating lehr 10 having a conveyor 20 extending therethrough for conveying glass sheets G from the lehr to a glass bending station 30. The glass sheet G is suspended from the conveyor by a carriage 40 having a pair of self closing scissor type tongs 41 grasping the glass sheet adjacent the latter's upper edge. Glass heated in the lehr 10 is conveyed by the conveyor 20 to the glass bending station 30 wherein a pair of forming members sandwich the glass sheet therebetween and thereby bend the heated glass sheet to conform to the shape of the forming members.

The lehr 10 is of conventional construction having an upper wall 11, a lower wall 12 and an end wall 13 having an opening therein for the emergence of the carriage and glass sheet.

Figure 2:
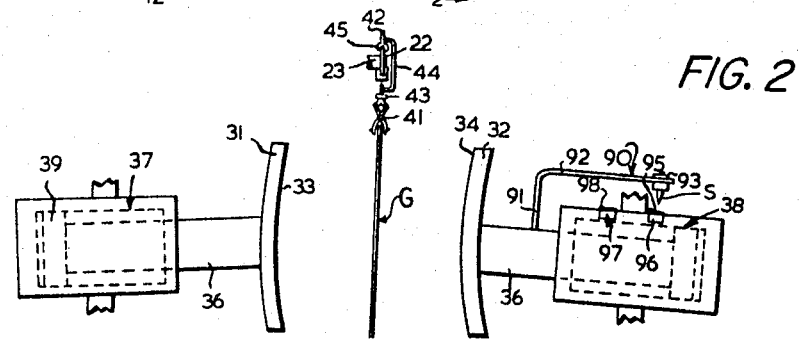
FIG. 2 is a vertical sectional view substantially along section 2—2 of FIG. 1.

The conveyor 20 is of standard construction consisting of an elongated structural member 21 having a plurality of rollers 22 projecting outwardly therefrom. The rollers pivot about a generally horizontal axis prependicular to the length of the member 21 and selected rollers may be driven for propelling the carriage along the conveyor. Each roller 22 is relatively narrow as seen in FIG. 2 and is secured to a shaft 23 adjacent the free end thereof. The shaft 23 as previously mentioned is journalled in the structural member 21.

The carriage 40 consists of an upper rail 42 and a lower rail 43 interconnected by a pair of tie bars or cross members 44. The upper rail 42 is substantially inverted T-shaped in cross-section having a groove 45 in the lower surface thereof for rolling engagements with the rollers 22. The lower rail 43 is also an inverted T-shaped in cross-section member disposed vertically below the rail 42 and in alignment therewith. The glass sheet G is suspended from the lower rail of the carriage by a pair of articulated tong members 41. The tongs are of a self closing scissor type having relatively high mechanical advantage and may, for example, be of the type illustrated in U.S. Patent 2,476,169 issued July 12, 1949 or alternatively, of the type illustrated in U.S. Patent 3,089,727 issued May 4, 1963. Tongs representative of the structures in the respective patents noted are illustrated respectively in FIGS. 5 and 6. Each tong 41 consists of a pair of levers 46 and 47 pivotally interconnected adjacent one end by a pin 48 to form a jaw 49. The other end of the levers 46 and 47 are pivotally secured respectively by pins 51 and 52 to links 53 and 54. The links 53 and 54 are pivotally interconnected by a pin 55 which also passes through a member 56 secured to and suspended from the lower rail 43.

Referring to FIG. 5 the jaw 49 includes a pair of vertically staggered members 57 and 58 having a conical end engaging opposed faces of the glass sheet G adjacent its upper marginal edge. As described in U.S. Patent 2,476,169, the purpose of the vertical offset of the glass engaging members is to reduce the amount of distortion in the bent glass sheet resulting from the tong being in engagement therewith during press bending.

Figure 6:
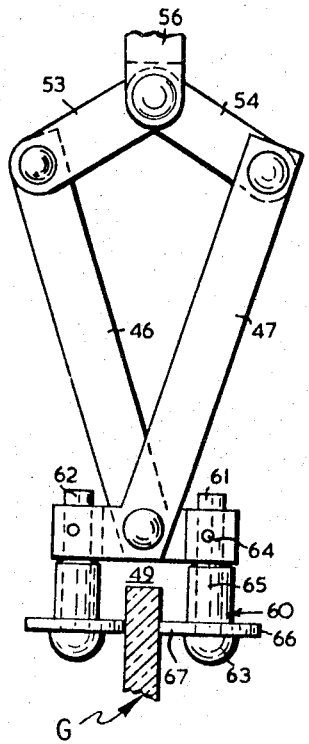
FIG. 6 is a vertical view similar to FIG. 5 but illustrating a modified form of tong.
Figure 7:
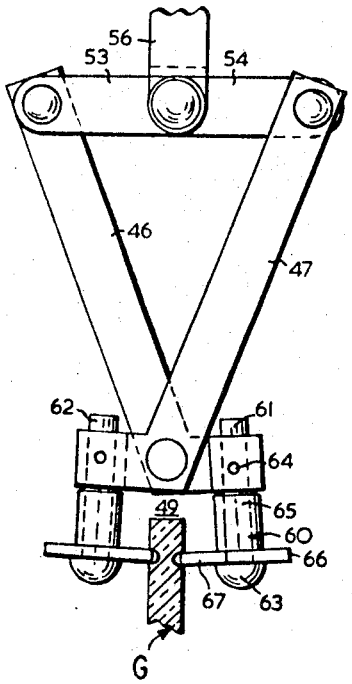
FIG. 7 is a view similar to FIG. 6 but with the tongs in a glass release position.

A second form of self closing scissor type tong is illustrated in FIGS. 6 and 7 and is of the type generally illustrated in U.S. Patent 3,089,727 issued May 14, 1963. The tong is generally similar to that illustrated in FIG. 5, except for a modified form of glass engaging member. In the tongs illustrated in FIGS. 6 and 7, the jaw 49 consists of a pair of members 60 secured to respective ones of the levers 46 and 47 by pins 61 and 62. The pins 61 and 62 each have an enlarged head 63 at one end of a stem which passes through a sleeve in respective ones of the levers. The stem is secured to the sleeve by a cotter pin 64. Each glass engaging member 60 consists of a sleeve 65 freely rotatable on the stem of the pin and an outwardly directed collar 66 having a portion thereof bearing against the head 63 of the pin. The collar 66 is relatively narrow in a direction along the axis of the pin and has a removed chordal section 67 which normally engages the glass sheet. The sleeve 65 and collar 66 secured thereto are somewhat shorter than the corresponding length of the stem or of the pin whereby a certain amount of rotational movement of the glass engaging member is permitted around the pins. As disclosed in the aforementioned U.S. Patent 3,089,727, this rotational movement has a tendency to reduce the distortion in the bent sheet of glass caused by the engagement of the tong with the glass sheet during bending of the latter. This rotational movement, however, is not required in carrying out the present invention.

FIGS. 8 and 9 are vertical partial sectional views illustrating engagement of the glass engaging members of the tongs with the glass sheet. In FIG. 8, the glass sheet is unbent whereas in FIG. 9, the glass sheet is bent. Referring to FIG. 8, the flange or collar 66 of the glass engaging members produce an indentation 70 in each of the opposed surfaces of the glass sheet G. After bending has occurred, it will be seen from the exaggerated view in FIG. 9, the indentations 70 no longer remain in horizontal alignment with the flanges 67 of the glass engaging members. In the past when the tongs remained in engagement with the glass during bending, the glass sheet had a tendency to remain in its original position as a result of engagement by the tongs. FIG. 4 is a top plan view of a bent glass sheet illustrating distortion adjacent the tong engaged portion of the sheet resulting from the tong being in engagement with the latter during bending. The distortion is illustrated in phantom and indicated generally by reference numeral F.

In order to overcome the difficulty of distortion caused by the tong engaging the glass sheet during bending, in accordance with the present invention, the self closing scissor type tongs are effectively relieved from supporting engagement with the sheet immediately prior to bending of the glass sheet and remain disengaged during bending thereof.

Tongs of the foregoing type may be relieved from engagement with the glass sheet by moving the jaw of the tongs relative to the tong support member 56 in a direction to reduce the distance therebetween. Such movement of the tong in effect moves the links 53 and 54 from the position illustrated in FIG. 6 to a position approximately that illustrated in FIG. 7. The positioning of the lever pivot pins however causes the tong jaw automatically to grasp and thereby support the sheet of glass upon relative movement of the sheet of glass and the tongs in a direction away from the tong support member 56. It is obvious that for the present invention disengagement of the tongs and glass sheet does not require complete physical disengagement but instead the disengagement is with respect to the supporting effect of the tongs on the sheet of glass.

Press bending of a glass sheet is effected at the bending station 30 by a pair of forming members 31 and 32 movable towards and away from one another so as to sandwich the glass sheet therebetween. The forming member 31 has a concave shaping surface 33 engageable with a major surface of the glass sheet G and the forming member 32 has a complementary convex shaping surface 34. The forming members 31 and 32 are secured respectively to piston rods 35 and 36 of hydraulic cylinder assemblies 37 and 38. A piston 39 is secured to the end of each of the piston rods and movement of the latter is effected by introduction of fluid into the cylinder at the appropriate side of the piston. In order to bend the glass sheet G, it is heated in the lehr to a softening temperature and thereafter, conveyed to the bending station 30 and movement along the conveyor is interrupted while the forming members are brought into contact with opposed surfaces of the glass sheet, pressure then being applied so as to form a sandwich as illustrated in FIG. 3.

Initial contact of the forming members 31 with the glass sheet is made by the upper and lower edges of the shaping surface 33. Similarly initial contact with the glass sheet is made by the central portion of the convex shaping surface 34. At the point of initial contact the glass sheet G is supported by the forming members and the tongs, in accordance with the present invention, are released at this instant such that the heated glass sheet is free to conform to the shape of the forming members during further travel of the same towards one another to form the sandwich as illustrated in FIG. 3.

Figure 3:
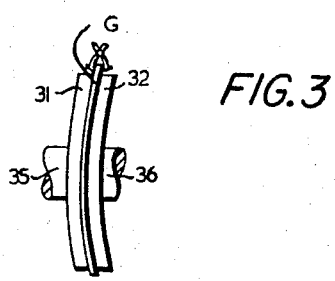
FIG. 3 is a vertical elevational view in partial section illustrating the forming members and a suspended glass sheet sandwiched therebetween.

FIGURES 2 and 3 illustrate the piston rods 36 as being inclined with respect to a plane transverse to the flat planar surface of the sheet of glass. In such embodiment the forming members travel in a converging path directed toward the support for the sheet of glass during bending of the same. In FIGURES 10 and 11 it will be noted the piston rods are disposed in a common plane such that the forming members travel in a common path during movement towards and away from one another. The path of movement in such embodiment is normal to the plane of the flat planar surface of the sheet of glass to be bent and where such sheet is suspended in a vertical plane as illustrated the movement is in a horizontal direction.

FIGS. 6 and 7 illustrate respectively engagement and disengagement of the glass engaging members with the glass sheet. Release of the glass engaging members during bending may be effected by raising the carriage from which the tongs and glass sheet grasped thereby are suspended at some instant prior to contact of the glass sheet by the shaping surfaces. At the instant the forming members contact and have sufficient force applied so as to support the glass sheet, the carriage together with the tongs suspended therefrom may then be lowered relative to the glass sheet and the tongs effectively thereby are released from the glass. In the release position the tongs assume a position generally indicated in FIG. 7. Opening of the tongs is effected by engagement of the flanges or collars 66 with respective ones of the grooves 70 formed in opposed faces of the glass sheet G. By appropriate positioning of the pivot pins and length of links, the levers 53 and 54 in this position may be substantially horizontal as illustrated or alternatively at some angle of inclination with respect to one another.

It is obvious that when they are horizontal in an open position, the glass engaging members will have a distance between them slightly greater than the thickness of the glass sheet G. This must of necessity be so to enable placing the glass sheet between the glass engaging members when the jaw of the tong is open.

In the event the area of contact with the glass sheet by the flanges or collars 66 and the positioning of the pivot pins is correlated to the weight of the glass such that relatively no indentation is caused, and the glass sheet is merely suspended by frictional engagement, release of glass tongs will cause the glass engaging members to slide downwardly along the face of the sheet of glass when the tongs are released by lowering the carriage relative to the glass sheet. Upon completion of the bending of the glass sheet it is again grasped by the tongs. As the forming members 31 and 32 are moved outwardly to an open position, the glass sheet G is released and upon its release may be automatically grasped by the tongs. The self-engagement of the tong with the glass is effected by the frictional engagement of the glass engaging member with the opposed surfaces of the glass sheet G.

Raising of the carriage may be effected by pneumatic cylinders. Shown in the drawings is a pair of hydraulic cylinders 80 each having a fixed member 81 and a movable piston member 82. The fixed member 81 is secured to the horizontal rail 21 of the conveyor and the piston rod 82 projects upwardly therefrom to engage the carriage upper rail 42. Actuation of the hydraulic or pneumatic cylinders is effected by a switch having an adjustable striker S mounted so as to move with the piston 35 or 36 and its associated carriage carrying the mould portion.

The striker S is mounted by a bracket 90 having a portion 91 secured to the piston rod 36 and a further portion 92 projecting rearwardly therefrom. The striker S consists of a block secured by a bolt and nut 93 to the portion 92. The bolt passes through a slot in the bracket such that the striker S may be moved horizontally. The striker S upon movement of the piston rod 36 engages a switch actuating member 95 of a switch 96 and thereby through suitable solenoids and valves effect actuation of the hydraulic cylinders. The horizontal sliding movement of the striker permits adjustment of the relative position of the glass sheet G and forming member 32 at which initiation of actuation of the air or hydraulic cylinders is effected.

In actual operation it has been found that the carriage may be raised 5/32" to produce suitable results in bending a glass sheet about a horizontal axis wherein the vertical dimension of the sheet is 17" and the radius of curvature is approximately 50". This radius of curvature is about a horizontal axis. It is not necessary, however, to use different lifting dimension for different glass sizes or radius of curvature.

It has been found that a lift of 5/32" produces satisfactory results in bending glass sheets having sizes ranging from 24" by 12" to 60" by 28" in thicknesses ranging from 3/16" to 1/4" and having curvatures ranging from almost flat to about a 30" radius. The curvature may be about either a horizontal or vertical axis. The lift of 5/32" is with respect to the forming members travelling in a direction inclined approximately 3° to the horizontal.

As previously mentioned the piston rods 36 may be inclined at a small angle with respect to a plane transverse to the flat planar surface of the unbent sheet of glass G. Actually, the angle of inclination may be selected such that the tongs may remain engaged with the sheet of glass during bending without causing damage to the bent sheet of glass. Such embodiment is disclosed by D. L. Thomas in Canadian application Ser. No. 850,289 filed May 20, 1962. In the instant case it will be obvious that the amount of carriage lift will be influenced by the piston rod inclination, particularly should the tongs remain partially engaged with the glass sheet during bending thereof.

Although the present invention is mainly concerned with bending about a horizontal axis, satisfactory results have been attained in bending about a vertical axis. It is obvious that the amount of lift may be varied within certain limits and in general, the lift is of an amount sufficient to release the glass sheet during bending and to permit the tong engaging members to re-engage the glass in their original impression. If the left is too great, the tong discs will leave their original tong impression resulting possibly in unwanted or detrimental side effects. The tongs for example may bear unequal loads causing the glass to swing into an adjoining glass sheet or if the glass sheet is very heavy, it may even slip and be released from the tong. It is also necessary to assure that the carriage is not de-railed because of being lifted from the rail.

The foregoing dimensions are not intended by way of limitation but rather illustrate by way of example actual operations which produce suitable results.

Lowering of the carriage is effected by a limit switch 97 having an actuating lever 98 engageable with the striker S or a further, adjustably mounted or fixed striker. The positioning of the striker and the switch 97 is such that the carriage is released immediately upon contact of the glass sheet by the shaping surfaces of the forming members.

From the embodiment illustrated, raising and lowering of the carriage is effected by movement of the forming members toward one another. It is obvious that the carriage being raised may be in response to positioning of the glass sheet at the glass bending station 30 rather than in response to movement of the forming member. Release of the tong and lowering of the carriage, however, must be tied in with movement of the forming member since the tongs cannot be released until such time as there is frictional engagement between the glass and the forming members sufficient to support the glass sheet. The frictional engagement is obviously related to the relative position of the forming members 31, 32 and the engagement thereof with the glass sheet.

As previously mentioned in the specification the lift of the carriage to release the tongs may be varied within certain limits and the preferred amount of lift is such that the tongs re-engage in their original impression. It is obvious that if the forming members, during the glass bending operation, travel in a converging path (such converging path being by virtue of the inclined position of the piston rods) the amount of carriage lift in some cases may be reduced. It is thus obvious that the amount of carriage lift is in some cases influenced by the path of travel followed by the forming members during the glass bending operation.

The forming members in one disclosed embodiment follow a converging path directed toward the support for the sheet of glass during bending thereof. In effect the forming members have a component of motion parallel to the flat sheet surface tending to lessen any stress imposed in the sheet by the tongs during bending of the sheet if such tongs remained in engagement therewith. In the other embodiment the forming members travel in a common path in which case maximum carriage lift will be required.

In the illustrative embodiment, the sheet of glass is suspended from an overhead conveyor in which case the sheet of glass is disposed in a vertical plane. The invention also has application where the sheet is lifted or supported in a tilted position. In such embodiment the tongs may provide only partial support for the sheet of glass and additional supports may be employed whereby the sheet of glass is disposed at some angle to the vertical.

I claim:

1. In the art of press bending a sheet of glass while at its temperature of deformation wherein said sheet is suspended by self closing scissor type tongs from a carriage movable in a substantially horizontal path on a conveyor assembly from a heating lehr to a position between the complementary shaping surfaces of a pair of forming members movable toward and away from one another, the improvement comprising vertically elevating said carriage and glass sheet suspended therefrom, moving the forming members towards one another to an extent sufficient to clampingly engage said sheet of glass between said forming members to support the same by frictional engagement therewith, lowering said carriage to suddenly relax said tongs and release the latter from supporting engagement with said sheet during further movement of the forming members toward one aother whereby the sheet of glass conforms to the shaping surface, moving the forming members away from one another and simultaneously suspending the formed glass sheet from said tongs.

2. A method as defined in claim 1 wherein raising of said carriage and sheet of glass suspended therefrom is in timed relation with respect to positioning of the sheet of glass intermediate the forming members and wherein lowering of said carriage is effected in timed relation with respect to movement of the forming members toward one another.

3. A method as defined in claim 2 wherein said forming members have an upwardly directed component of motion as they travel towards one another during bending of said sheet of glass.

4. A method as defined in claim 2 wherein said forming members travel towards one another along a common path during bending of the sheet of glass.

5. Apparatus for press bending in sequence a plurality of sheets of glass comprising:
 (a) a pair of complementary shaped forming members;
 (b) means mounting said forming members for movement away from and toward one another respectively to receive and sandwich a sheet of glass therebetween;
 (c) carriage means adapted to travel along a preselected path;
 (d) self-closing scissor type tongs connected to said carriage for gripping upper edge portions of said sheets of glass to support the latter;
 (e) conveyor means defining said preselected path of travel for said carriage means for delivering in sequence sheets of tong supported glass to a position between said shaping members and subsequently in the same sequence transporting the bent sheets of glass away from the forming members;
 (f) means to raise said carriage vertically above said preselected path prior to engagement of the forming members and said sheet of glass to be sandwiched therebetween;
 (g) means to lower said carriage downwardly after the forming members have come into frictional supporting engagement with the glass sheet to effect disengagement of said tongs from supporting engagement with the sheet of glass prior to actual bending of the latter, thereby eliminating deformation in the shaped sheet of glass normally due to the tongs remaining in supporting engagement with the glass sheet throughout the bending thereof.

6. Apparatus for press bending in sequence a plurality of sheets of glass comprising:
 (a) a pair of complementary shaped forming members;
 (b) means mounting said forming members for movement away from and toward one another respectively to receive and sandwich a sheet of glass therebetween;
 (c) carriage means adapted to travel along a preselected path;
 (d) self-closing scissor type tongs connected to said carriage for gripping upper edge portions of said sheets of glass to support the latter, said scissor type tongs including a pair of levers pivotally attached together at an intermediate point, link members pivotally attached to upper end portions of said levers, a tong support member connected to said carriage means pivotally attaching said link members to said tong support member, and glass engaging members carried by said levers adjacent lower end portions thereof, all constructed and arranged such that movement of the glass engaging members relative to said tong support member in a sense as to reduce the distance therebetween releases the glass engaging members from supporting engagement with said glass sheet;
 (e) conveyor means defining said preselected path of travel for said carriage means for delivering in sequence sheets of tong supported glass to a position between said shaping members and subsequently in the same sequence transporting the bent sheets of glass away from the forming members; and
 (f) means for disengaging said tongs from supporting engagement with the sheet of glass after the forming members have come into frictional supporting engagement with the latter and prior to actual bending of same, said last mentioned means including means to lower said carriage downwardly after the forming members have come into said frictional supporting engagement with the glass sheet hence effecting said relative movement between the glass engaging members and the tong support member to effect said release of the glass engaging members from the glass sheet, thereby eliminating deformation in the shaped sheet of glass normally due to the tongs remaining in supporting engagement with the glass sheet throughout the bending thereof.

References Cited
UNITED STATES PATENTS 3,220,817 11/1965 Malobicky et al. _____ 65—104
3,290,133 12/1966 Thomas _____ 65—106

DONALL H. SYLVESTER, Primary Examiner.

A. D. KELLOGG, Assistant Examiner.

U.S. Cl. X.R.

65—273, 275, 287, 289